(12) United States Patent
Xu et al.

(10) Patent No.: US 10,440,702 B2
(45) Date of Patent: Oct. 8, 2019

(54) COMMUNICATION CONTROL METHOD AND DEVICE (71) Applicant: BEIJING SPREADTRUM HI-TECH COMMUNICATIONS TECHNOLOGY CO., LTD., Beijing (CN)

(72) Inventors: Weijie Xu, Shanghai (CN); Huayu Zhou, Shanghai (CN)

(73) Assignee: BEIJING SPREADTRUM HI-TECH COMMUNICATIONS TECHNOLOGY CO., LTD., Beijing (CN)

( * ) Notice: Subject to any disclaimer, the term of this patent is extended or adjusted under 35 U.S.C. 154(b) by 224 days.

(21) Appl. No.: 15/416,452

(22) Filed: Jan. 26, 2017

(65) Prior Publication Data
US 2018/0041993 A1 Feb. 8, 2018

(30) Foreign Application Priority Data
Aug. 5, 2016 (CN) .......................... 2016 1 0639953

(51) Int. Cl.
H04W 72/04 (2009.01)
H04L 5/00 (2006.01)

(52) U.S. Cl.
CPC ......... *H04W 72/042* (2013.01); *H04L 5/0053* (2013.01); *H04W 72/0446* (2013.01); *H04W 72/0453* (2013.01); *H04L 5/0007* (2013.01)

(58) Field of Classification Search
CPC ........... H04W 72/042; H04W 72/0446; H04W 72/0453; H04L 5/0053; H04L 5/0007
See application file for complete search history.

(56) References Cited

U.S. PATENT DOCUMENTS

| 2011/0032894 A1* | 2/2011 | Miki ..................... H04L 1/1854 370/329 |
| 2014/0071915 A1 | 3/2014 | Papasakellariou et al. |
| 2014/0071954 A1 | 3/2014 | Au et al. |
| 2015/0016431 A1 | 1/2015 | Ranta-Aho et al. |

(Continued)

FOREIGN PATENT DOCUMENTS

| CN | 102264136 A | 11/2011 |
| CN | 104067683 A | 9/2014 |

(Continued)

OTHER PUBLICATIONS

SIPO Second Office Action corresponding to CN Application No. 201610639953.1; dated Aug. 3, 2018.

(Continued)

*Primary Examiner* — Rina C Pancholi
(74) *Attorney, Agent, or Firm* — Cantor Colburn LLP (57) ABSTRACT Communication control method and device are provided. The method includes: determining M parts of resources for transmitting a control area in N parts of resources, wherein the N parts of resources are acquired by dividing, in a frequency domain, frequency resources of symbols for transmitting the control area in a s-TTI, M and N are integers, $1 \leq M \leq N$; and transmitting a PDCCH to a terminal through the control area. The method and device may realize communication control of the network to the terminal more flexibly and with less average resource overhead in the s-TTI technology.

22 Claims, 4 Drawing Sheets

S21 — the N parts of resources are numbered

S22 — the M parts of resources with numbers of mode (R_offset+iL, N) are selected from the N parts of resources, where i ∈ [0, M-1], R_offset is an offset of the resource, and L is an integer (56) References Cited

U.S. PATENT DOCUMENTS

2016/0088652 A1   3/2016   Patel et al.
2016/0128028 A1*  5/2016   Mallik ................ H04W 72/042
                                                        370/336
2017/0331547 A1* 11/2017   Kim ......................... H04B 7/26

FOREIGN PATENT DOCUMENTS

| CN | 104620629 A  | 5/2015 |
|----|--------------|--------|
| CN | 104769871 A  | 7/2015 |
| WO | 2016069270 A1| 5/2016 |

OTHER PUBLICATIONS

Erik Dahlman et al., "3G Evolution HSPA and LTE," Dec. 31, 2010, pp. 121-122, 363.
HiSilicon Huawei, "Control signaling enhancements for short TTI," 3GPP TSG RAN WG1 Meeting #83; Nov. 15-22, 2015; R1-156461.
SIPO First Office Action corresponding to Application No. 201610639953.1; dated May 4, 2018.

* cited by examiner

COMMUNICATION CONTROL METHOD AND DEVICE

CROSS-REFERENCE TO RELATED APPLICATIONS

The present application claims priority to Chinese patent application No. 201610639953.1, filed on Aug. 5, 2016, and entitled "COMMUNICATION CONTROL METHOD AND DEVICE", and the entire disclosure of which is incorporated herein by reference.

TECHNICAL FIELD

The present disclosure generally relates to radio communication technology, and more particularly, to communication control method and device.

BACKGROUND

Transmission Time Interval (TTI) which determines a scheduling mode of time-frequency resources is an essential parameter in a radio communication system, such as a Long-Term Evolution (LTE) system.

With the development of communication technology, more and more applications, such as online games, virtual reality, industrial monitoring or Internet of Vehicles, have stricter requirements on time delay in communication transmission. They always expect a shorter end-to-end time delay in communication. In radio communication systems, such as the LTE system, it is found that shortening TTI can greatly reduce an air interface delay, based on the search on factors that influence the throughput of applications of Transmission Control Protocol (TCP). A relatively short TTI benefits various radio communication service, however, it also causes some problems, for example, more system overhead.

Currently, 3GPP has confirmed to study shortened TTI (s-TTI) technology. A S-TTI generally has length of two symbols, three symbols, four symbols or seven symbols. Due to system overhead, it is hard to apply existing communication control methods to the s-TTI technology.

SUMMARY

In embodiments of the present disclosure, a flexibly resource configuration method is provided for network in the s-TTI technology, to realize communication control of the network to a terminal with less average resource overhead.

In an embodiment of the present disclosure, a communication control method is provided, including: determining M parts of resources for transmitting a control area in N parts of resources, wherein the N parts of resources are acquired by dividing, in a frequency domain, frequency resources of symbols for transmitting the control area in a s-TTI, M and N are integers, $1 \leq M \leq N$; and transmitting a physical downlink control channel (PDCCH) to a terminal through the control area.

Optionally, the method may further include: following determining M parts of resources for transmitting a control area in N parts of resources, transmitting an indication message which indicates a ratio of M to N to the terminal, so that the terminal detects the PDCCH based on the indication message.

Optionally, transmitting an indication message to the terminal may include: transmitting the indication message through a dedicated physical layer channel or another PDCCH.

Optionally, the dedicated physical layer channel may be configured to carry a K-bit message which carries the indication message, where $2^K \geq N$.

Optionally, determining M parts of resources for transmitting a control area in N parts of resources may include: determining a value of M based on a number of resources required by transmitting the PDCCH in the s-TTI.

Optionally, determining M parts of resources for transmitting a control area in N parts of resources may include one of followings: selecting the M parts of resources from the N parts of resources at intervals; and selecting the M parts of resources from the N parts of resources without an interval.

Optionally, to different cells, the M parts of resources may be different or not exactly the same.

Optionally, determining M parts of resources for transmitting a control area in N parts of resources may include: numbering the N parts of resources; and selecting the M parts of resources with numbers of mode (R_offset+iL, N) from the N parts of resources, where $i \in [0, M-1]$, R_offset is an offset of the resource, and L is an integer.

Optionally, a value of R_offset may be a value determined based on an identifier (ID) of a cell or a value agreed with the terminal.

Optionally, a value of N may be determined based on agreement with the terminal or by a network.

Optionally, if the value of N is determined by the network, the method may further include: indicating the value of N to the terminal.

Optionally, the method may further include: determining a position of the symbols for transmitting the control area in the s-TTI; and indicating the position of the symbols for transmitting the control area in the s-TTI to the terminal.

Optionally, the method may further include: determining a position of the symbols for transmitting the control area in the s-TTI based on the agreement with the terminal.

Optionally, in the frequency domain, the frequency resources of the symbols for transmitting the control area in the s-TTI may be divided in Physical Resource Block (PRB), in PRB group, in sub-carrier, or in sub-carrier group.

In an embodiment of the present disclosure, a communication control method is provided, including: detecting a PDCCH sent by a network in a control area, wherein the control area occupies M parts of resources among N parts of resources, the N parts of resources are acquired by dividing, in a frequency domain, frequency resources of symbols for transmitting the control area in a s-TTI, M and N are integers, and $1 \leq M \leq N$.

Optionally, the method may further include receiving an indication message which indicates a ratio of M to N from the network, wherein detecting the PDCCH in the control area includes detecting the PDCCH in the control area based on the indication message.

Optionally, receiving an indication message from the network may include detecting and processing a dedicated physical layer channel to acquire the indication message.

Optionally, the dedicated physical layer channel may be configured to carry a K-bit message which carries the indication message, where $2^K \geq N$.

Optionally, the control area occupying the M parts of resources among the N parts of resources may include one of followings: the control area occupying M parts of resources distributed at intervals in the N parts of resources; and the control area occupying M parts of resources distributed continuously in the N parts of resources.

Optionally, to different cells, the M parts of resources may be different or not exactly the same.

Optionally, resources with numbers of mode (R_offset+iL, N) are selected from the N parts of resources as the M parts of resources, where i∈[0, M−1], R_offset is an offset of the resource, and L is an integer.

Optionally, a value of R_offset may be a value determined based on an identifier (ID) of a cell or a value agreed with a terminal.

Optionally, a value of N may be determined based on agreement with the network and a terminal, or by the network.

Optionally, if the value of N is determined by the network, the method may further include: acquiring the value of N from the network.

Optionally, a value of M may be determined by the network based on a number of resources required by transmitting the PDCCH in the s-TTI.

Optionally, the method may further include: prior to detecting a PDCCH sent by a network in a control area, determining a position of the symbols for transmitting the control area in the s-TTI.

Optionally, determining a position of the symbols for transmitting the control area in the s-TTI may include acquiring the position of the symbols for transmitting the control area in the s-TTI from the network.

Optionally, in the frequency domain, the frequency resources of the symbols for transmitting the control area in the s-TTI may be divided in PRB, in PRB group, in sub-carrier, or in sub-carrier group.

In an embodiment of the present disclosure, a communication control device is provided, including: a control area determining circuitry configured to determine M parts of resources for transmitting a control area in N parts of resources, wherein the N parts of resources are acquired by dividing, in a frequency domain, frequency resources of symbols for transmitting the control area in a s-TTI, M and N are integers, 1≤M≤N; and a downlink control channel transmitting circuitry configured to transmit a PDCCH to a terminal through the control area.

Optionally, the device may further include an indication message transmitting circuitry configured to transmit an indication message which indicates a ratio of M to N to the terminal, so that the terminal detects the PDCCH based on the indication message.

Optionally, the indication message transmitting circuitry may be configured to transmit the indication message through a dedicated physical layer channel or another PDCCH.

Optionally, the dedicated physical layer channel may be configured to carry a K-bit message which carries the indication message, where $2^K \geq N$.

Optionally, the control area determining circuitry may be configured to determine a value of M based on a number of resources required by transmitting the PDCCH in the s-TTI.

Optionally, the control area determining circuitry may be configured to select the M parts of resources from the N parts of resources at intervals or without an interval.

Optionally, the control area determining circuitry may be configured to determine M parts of different resources or M parts of resources not exactly the same for different cells.

Optionally, the control area determining circuitry may include: a numbering circuitry configured to number the N parts of resources; and a selecting circuitry configured to select the M parts of resources with numbers of mode (R_offset+iL, N) from the N parts of resources, where ∈[0, M−1], R_offset is an offset of the resource, and L is an integer.

Optionally, a value of R_offset may be a value determined based on an ID of a cell or a value agreed with the terminal.

Optionally, if a value of N is determined by a network, the device may be further configured to indicate the value of N to the terminal.

Optionally, the device may further include: a first symbol position determining circuitry configured to determine a position of the symbols for transmitting the control area in the s-TTI; and a position indicating circuitry configured to indicate the position of the symbols for transmitting the control area in the s-TTI to the terminal.

Optionally, the device may further include a second symbol position determining circuitry configured to determine a position of the symbols for transmitting the control area in the s-TTI based on the agreement with the terminal.

Optionally, in the frequency domain, the frequency resources of the symbols for transmitting the control area in the s-TTI may be divided in PRB, in PRB group, in sub-carrier, or in sub-carrier group.

In an embodiment of the present disclosure, a communication control device is provided, including: a PDCCH detecting circuitry configured to detect a PDCCH sent by a network in a control area, wherein the control area occupies M parts of resources among N parts of resources, the N parts of resources are acquired by dividing, in a frequency domain, frequency resources of symbols for transmitting the control area in a s-TTI, M and N are integers, and 1≤M≤N.

Optionally, the device may further include an indication message receiving circuitry configured to receive an indication message which indicates a ratio of M to N from the network, wherein the PDCCH detecting circuitry may be configured to detect the PDCCH in the control area based on the indication message.

Optionally, the indication message receiving circuitry may be configured to detect and process a dedicated physical layer channel to acquire the indication message.

Embodiments of the present disclosure may provide following advantages. By dividing, in a frequency domain, frequency resources of symbols for transmitting a control area, a network may flexibly determine, according to service load, a portion of or all the time-frequency resources among resources for transmitting the control area to be used for transmitting the control area. In this way, average overhead of the control area during the communication control by the network to the terminal may be reduced to further save resources in a s-TTI, so that the network realizes the communication control to the terminal with limited resources in the s-TTI.

Further, to different cells, the M parts of resources may be different or not exactly the same, which may reduce interferences between the different cells.

Further, time-frequency distribution of the control area may be determined based on a number of resources required by transmitting the PDCCH in the s-TTI. In this way, the PDCCH and a physical downlink link shared channel can multiplex symbols in the s-TTI to improve system efficiency.

DETAILED DESCRIPTION

As described in the background, currently, 3GPP has confirmed to study s-TTI technology. However, due to system overhead, it is hard to apply existing communication control methods to the s-TTI technology.

Embodiments of the present disclosure may provide following advantages. By dividing, in a frequency domain, frequency resources of symbols for transmitting a control area, a network may flexibly determine, according to service load, a portion of or all the time-frequency resources among resources for transmitting the control area to be used for transmitting the control area. In this way, average overhead of the control area during the communication control by the network to the terminal may be reduced to further save resources in a s-TTI, so that the network realizes the communication control to the terminal with limited resources in the s-TTI.

Further, to different cells, the M parts of resources may be different or not exactly the same, which may reduce interferences between the different cells.

Further, time-frequency distribution of the control area may be determined based on a number of resources required by transmitting the PDCCH in the s-TTI. In this way, the PDCCH and a physical downlink link shared channel can multiplex symbols in the s-TTI to improve system efficiency.

In order to clarify the object, solutions and advantages of embodiments of the present disclosure, embodiments of present disclosure will be described clearly in detail in conjunction with accompanying drawings.

Figure 1:
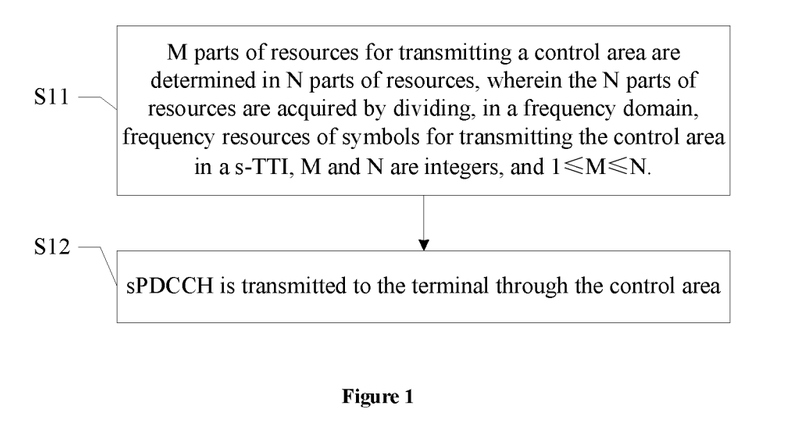
FIG. 1 schematically illustrates a flow chart of a communication control method according to an embodiment.

FIG. 1 schematically illustrates a flow chart of a communication control method according to an embodiment. Referring to FIG. 1, the method may be used in a network.

In S11, M parts of resources for transmitting a control area are determined in N parts of resources, wherein the N parts of resources are acquired by dividing, in a frequency domain, frequency resources of symbols for transmitting the control area in a s-TTI, M and N are integers, and $1 \leq M \leq N$.

In some embodiments, length of the s-TTI may be determined based on practical communication requirements. The symbols for transmitting the control area may be OFDM symbols having length of two symbols, three symbols, four symbols or seven symbols. Among the symbols, one or more symbols are used for transmitting the control area and may be divided into N parts of resources in frequency domain. Further, the M parts of resources are determined among the N parts of resources, so that the control area is transmitted in the M parts of resources.

Those skilled in the art can understand that, prior to dividing the symbols for transmitting the control area in the s-TTI, a position of the symbols for transmitting the control area is determined. In some embodiments, the position of the symbols for transmitting the control area is determined by the network or based on agreement with a terminal.

If the position of the symbols for transmitting the control area is determined by the network, the network may indicate the position of the symbols for transmitting the control area to the terminal, so that the terminal searches in the symbols and acquires information for controlling area bearer.

If the position of the symbols for transmitting the control area is determined based on agreement with the terminal, different numbers of symbols for transmitting the control area may be agreed to s-TTIs with different length.

For example, to a s-TTI with length of two symbols, the control area may be located in a first symbol in the s-TTI.

To a s-TTI with length of three or four symbols, the control area may be located in a first symbol in the s-TTI, or in first and second symbols in the s-TTI.

To a s-TTI with length of seven symbols, the control area may be located in a first symbol in the s-TTI, or in first and second symbols in the s-TTI, or in first, second and third symbols in the s-TTI.

In some embodiments, a value of N may be determined by the network or based on agreement with the terminal. If the value of N is determined by the network, the network may indicate the value of N to the terminal, for example, through a broadcast signaling or a Radio Resource Control (RRC) dedicated signaling.

In some embodiments, in the frequency domain, the frequency resources of the symbols for transmitting the control area in the s-TTI may be divided with different modes in different units. The frequency resources of the symbols for transmitting the control area in the s-TTI may be divided evenly or into the N parts of resources with different sizes.

In some embodiments, in the frequency domain, the frequency resources of the symbols for transmitting the control area in the s-TTI may be divided in PRB, in PRB group, in sub-carrier, or in sub-carrier group.

In some embodiments, the frequency resources of the symbols for transmitting the control area in the s-TTI may be divided with a same interval (evenly) or with a different interval (unevenly). An example is described in detail, where the number of symbols for transmitting the control area is two, and the division is performed with the same interval.

In the embodiment, to control the overhead of the control area, based on the agreement with the terminal, the network sets the control area of the s-TTI in a first OFDM symbol in the s-TTI acquiescently. For convenience of description, assume a system band is 20 MHz, an available band of s-TTI is 48 PRBs, a band of the transmission control channel is 48 PRBs, and symbols for transmitting the control area are divided into 4 parts at the network, i.e., N=4.

Based on the above conditions, PRBs of an LTE system in the s-TTI are numbered with 1, 2, 3, . . . , 48 from low to high in frequency, and sub-carriers of the LTE system in the s-TTI are numbered with 1, 2, 3, . . . , 12*48 based on frequency. Therefore, the frequency resources of the symbols for transmitting the control area in the s-TTI may be divided in following ways.

In some embodiments, the frequency resources of the symbols for transmitting the control area in the s-TTI are divided in PRB with a same interval. In some embodiments, the frequency resources of the symbols are divided in PRB from low to high frequency in sequence into four parts, until all the 48 PRBs are allocated.

The frequency resources of the symbols for transmitting the control area in the s-TTI are divided in PRB to obtain the following four parts of frequency resources. The first part of frequency resources include 12 PRBs with numbers 1, 5, 9, . . . , 45 (referring to an area 71 in FIG. 7); the second part of frequency resources include 12 PRBs with numbers 2, 6, 10, . . . , 46 (referring to an area 72 in FIG. 7); the third part of frequency resources include 12 PRBs with numbers 3, 7, 11, . . . , 47 (referring to an area 73 in FIG. 7); and the fourth part of frequency resources include 12 PRBs with numbers 4, 8, 12, . . . , 48 (referring to an area 74 in FIG. 7).

Figure 7:
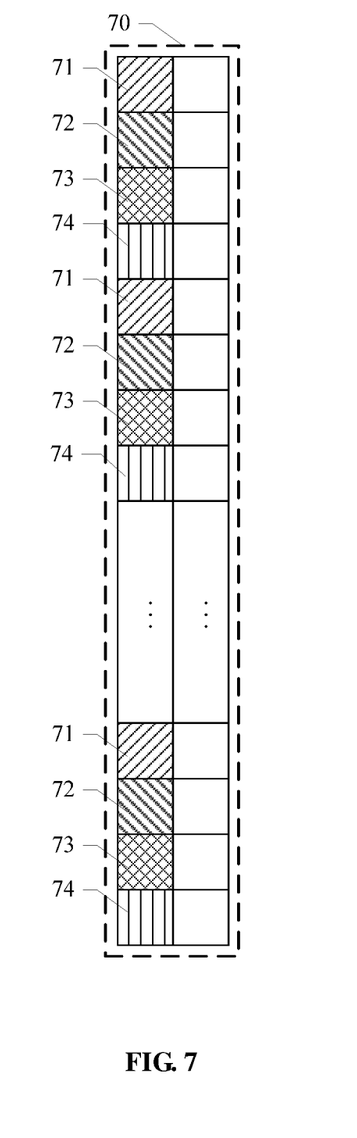
FIG. 7 schematically illustrates a structural diagram of a s-TTI according to an embodiment.

Those skilled in the art can understand that, in FIG. 7, 70 represents one s-TTI, two columns therein represent two symbols, and the first column represents the first symbol for transmitting the control area which includes a plurality of PRBs.

In some embodiments, the frequency resources of the symbols for transmitting the control area in the s-TTI are divided in PRB group with a same interval. In some embodiments, the frequency resources of the symbols are divided in PRB group from low to high frequency in sequence into four parts, until all the 48 PRBs are allocated.

For example, if each PRB group includes 12 PRBs, the frequency resources of the symbols for transmitting the control area in the s-TTI are divided in PRB group to obtain the following four parts of frequency resources. The first part of frequency resources include 12 PRBs with numbers 1, 2, 3, . . . , 12, the second part of frequency resources include 12 PRBs with numbers 13, 14, 15, . . . , 24, the third part of frequency resources include 12 PRBs with numbers 25, 26, 27, . . . , 36, and the fourth part of frequency resources include 12 PRBs with numbers 37, 38, 39, . . . , 48.

For another example, if each PRB group includes 6 PRBs, the frequency resources of the symbols for transmitting the control area in the s-TTI are divided in PRB group to obtain the following four parts of frequency resources. The first part of frequency resources include 12 PRBs with numbers 1, 2, 3, . . . , 6 and 25, 26, 27, . . . , 30, the second part of frequency resources include 12 PRBs with numbers 7, 8, 9, . . . , 12 and 31, 32, 33, . . . , 36, the third part of frequency resources include 12 PRBs with numbers 13, 14, 15, . . . , 18 and 37, 38, 39, . . . , 42, and the fourth part of frequency resources include 12 PRBs with numbers 19, 20, 21, . . . , 24 and 43, 44, 45, . . . , 48.

In some embodiments, the frequency resources of the symbols for transmitting the control area in the s-TTI are divided in sub-carrier with a same interval. In some embodiments, the frequency resources of the symbols are divided in sub-carrier from low to high frequency in sequence into four parts, until all the 48 PRBs are allocated.

When the frequency resources of the symbols for transmitting the control area in the s-TTI are divided in sub-carrier, if the symbols include a pilot, an Resource Element (RE) corresponding to the pilot may be neglected during the division, that is, the RE corresponding to the pilot is not considered as one of the resources. In some embodiments, the RE corresponding to the pilot is not neglected during the division, that is, the RE corresponding to the pilot is also considered as the resources.

Division of the frequency resources of the symbols for transmitting the control area in the s-TTI in sub-carrier may be similar with division of the frequency resources of the symbols for transmitting the control area in the s-TTI in PRB, and is not described in detail here.

In some embodiments, the frequency resources of the symbols for transmitting the control area in the s-TTI are divided in sub-carrier group with a same interval. In some embodiments, the frequency resources of the symbols are divided in sub-carrier group from low to high frequency in sequence into four parts, until all the 48 PRBs are allocated.

In some embodiments, the selection of the sub-carriers may be related to the density of pilots. If one PRB includes two pilot symbols and an interval between the two pilot symbols includes six symbols, length of each sub-carrier group may be six-sub-carriers, that is, each sub-carrier group includes one pilot symbol. In this way, different sub-carrier groups include a same number of pilot symbol.

In some embodiments, the available band of the s-TTI may be 10 MHz or 5 MHz. The band of transmission control channel may be fewer than 48 PRBs, for example, half of the available band of the s-TTI, i.e., 24 PRBs. The frequency resources of the symbols for transmitting the control area may be divided into other numbers of parts. The above embodiments are only examples but not limit the available band of the s-TTI, the band of transmission control channel and the number of parts which the frequency resources of the symbols for transmitting the control area can be divided into.

"First", "second", "third" and "fourth" in "the first part of frequency resources", "the second part of frequency resources", "the third part of frequency resources" and "the fourth part of frequency resources" are used for distinguishing the four parts of frequency resources obtained by each division way but not limit the numbers of the four parts of frequency resources.

After the frequency resources of the symbols for transmitting the control area in the s-TTI are divided into N parts of resources, M parts of resources for transmitting the control area are selected from the N parts of resources through various ways.

In some embodiments, a value of M may be determined based on a number of resources required by transmitting a physical downlink control channel in the s-TTI, to further determine the M parts of resources for transmitting the control area among the N parts of resources. Hereinafter, physical downlink control channel in embodiments of the present disclosure is called sPDCCH to differ from a PDCCH in an LTE system.

In some embodiments, the number of resources required by transmitting the sPDCCH in the s-TTI may be determined by: the network determining a number of sPDCCHs needed to be transmitted in the s-TTI based on a service scheduling situation; determining a number of time-frequency resources required by each sPDCCH based on channel quality of UE; and calculating a total number of resources required by transmitting the sPDCCHs based on the number of sPDCCHs needed to be transmitted in the s-TTI and the number of time-frequency resources required by each sPDCCH.

After the value of M is determined, the M parts of resources for transmitting the control area may be determined among the N parts of resources through various ways.

In some embodiments, the M parts of resources may be selected from the N parts of resources at intervals or without an interval.

Selecting the M parts of resources from the N parts of resources without an interval may include: numbering the N parts of resources determined by the network according to frequency to obtain the N parts of resources with numbers of 1, 2, 3, . . . , N; and selecting the M parts of resources with numbers of 1, 2, 3, . . . , M from the N parts of resources, for transmitting the control area.

In some embodiments, selecting the M parts of resources from the N parts of resources at intervals may include: numbering the N parts of resources determined by the network according to frequency to obtain the N parts of resources with numbers of 1, 2, 3, . . . , N; and selecting one part of resource with an interval of L parts of resources as the resource for transmitting the control area, in which manner, obtaining the M parts of resources with numbers of 1, 1+L, 1+2L, . . . , 1+(M−1)*L.

Figure 2:
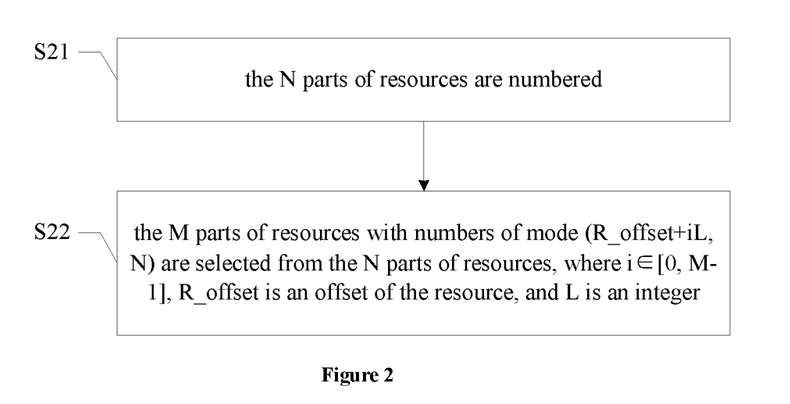
FIG. 2 schematically illustrates a flow chart of selecting M parts of resources according to an embodiment.

Referring to FIG. 2, FIG. 2 schematically illustrates a flow chart of selecting M parts of resources from N parts of resources at intervals or without an interval according to an embodiment.

In S21, the N parts of resources are numbered.

In some embodiments, the N parts of resources are numbered based on frequency of the resources, from low frequency to high frequency or from high frequency to low frequency.

In S22, the M parts of resources with numbers of mode (R_offset+iL, N) are selected from the N parts of resources, where i∈[0, M−1], R_offset is an offset of the resource, and L is an integer.

Mode is a modulo operation, and mode (R_offset+iL, N) represents performing modulo operation to N with R_offset+iL.

It can be seen that, when L is zero, the M parts of resources are resources with continuously distributed numbers. When L is other integer, the M parts of resources are resources with numbers distributed at intervals. When the N parts of resources are numbered based on frequency, the resources with continuously distributed numbers are also continuous in frequency.

A value of R_offset may be a value determined based on an ID of a cell or a value agreed with the terminal. If the value of R_offset is determined by the network, the network may inform the terminal the value, for example, through a broadcast message.

If the M parts of resources for transmitting the control area are selected based on the offset of the resource R_offset, the selection result may be different or not exactly the same to different cells, which may reduce interferences between the different cells.

In some embodiments, following determining the M parts of resources for transmitting the control area in the N parts of resources, an indication message which indicates a ratio of M to N is transmitted to the terminal, so that the terminal detects the sPDCCH based on the indication message.

In some embodiments, the indication message may be transmitted through a dedicated physical layer channel, for example, similarly with a way that Physical Control Format Indicator Channel (PCFICH) indicates PDCCH the number of occupied symbols in LTE.

To differ from LTE, a physical control format indicator channel in embodiments of the present disclosure is called sPCFICH. Coding and resource mapping of the sPCFICH are similar as PCFICH.

In some embodiments, prior to determining the N parts of resources, a position of time-frequency resources occupied by the sPCFICH may be determined, which is not involved in the division of frequency resources. That is, the N parts of resources do not include the time-frequency resources occupied by the sPCFICH. In some embodiments, the position of time-frequency resources occupied by the sPCFICH may be determined after the N parts of resources are determined. If the position of time-frequency resources occupied by the sPCFICH is determined after the N parts of resources are determined, the time-frequency resources occupied by the sPCFICH are not involved in subsequent resource mapping in the sPDCCH domain.

In some embodiments, the network may transmit the indication message through sPDCCH which may be transmitted in a control area of the current LTE. As mentioned above, the physical downlink control channel in embodiments of the present disclosure is called sPDCCH to differ from the PDCCH in the LTE system. The PDCCH may be an area of a physical downlink control channel transmitted to a terminal in the current LTE.

In some embodiments, the dedicated physical layer channel may carry a K-bit message which carries the indication message, where $2^K \geq N$.

For example, if N is 4, the ratio of M to N may be ¼, ½, ¾ or 1, K may be 2, the four ratios are represented by 2-bit information respectively, as shown in Table 1.

TABLE 1

| bit | 00 | 01 | 10 | 11 |
|---|---|---|---|---|
| ratio | 1/4 | 1/2 | 3/4 | 1 |

Still referring to FIG. 1, in S12, sPDCCH is transmitted to the terminal through the control area.

In some embodiments, after the resources for transmitting the control area are determined, a transmission procedure for other physical downlink control channels may be referred to existing design methods or principles of PDCCH, which has high compatibility to existing protocols.

In some embodiments, sPDCCH may be multiplexed. For example, DL or UL of a same user is multiplexed, sPDCCHs of different users are multiplexed. In some embodiments, scrambling, modulation, layer mapping, pre-coding and resource mapping are performed to the sPDCCH, which processes may employ or refer to methods of PDCCH stipulated by LTE protocols.

In some embodiments, a REG defining method of LTE PDCCH is referred. REG of PDCCH is defined with PRB as granularity. If the N parts of resources are divided with sub-carrier or sub-carrier group as granularity, in frequency domain, each part of resource is discretely distributed in sub-carrier level or in sub-carrier group level. Multiple discrete adjacent sub-carriers or sub-carrier groups make up a virtual PRB, based on which REG is defined. Similar with existing method, definition of REG needs to take pilot distribution condition in a PRB on control area symbols or in a virtual PRB into consideration. Details can be found in section 6.2.4 of the standard 3GPP 36211 and are not described in detail here.

The above communication control method is applicable to the network. In the embodiments, by dividing, in the frequency domain, the frequency resources of symbols for transmitting the control area, a portion of the time-frequency resources among resources for transmitting the control area are used for transmitting the control area. In this way, average resource overhead of the control area may be reduced to further save resources in the s-TTI, so that the network realizes the communication control to the terminal with limited resources in the s-TTI.

Figure 3:
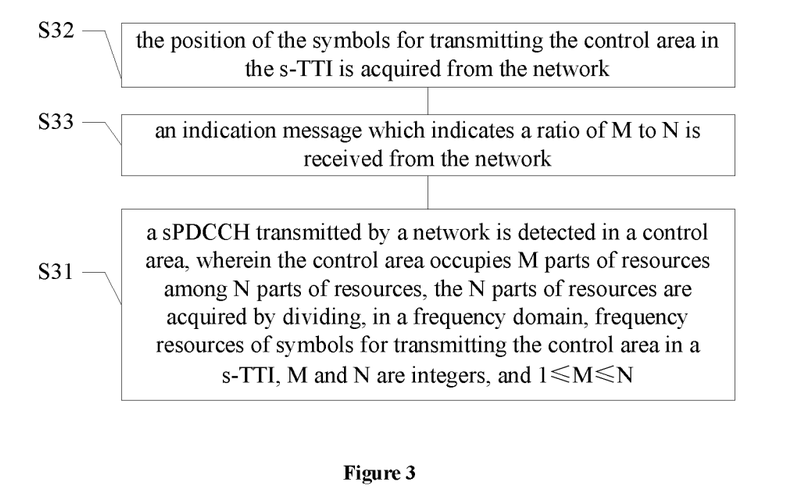
FIG. 3 schematically illustrates a flow chart of a communication control method according to another embodiment.

FIG. 3 schematically illustrates a flow chart of a communication control method according to another embodiment. Referring to FIG. 3, the method may be applicable to a terminal. Details of the method are described in conjunction with FIG. 3 below.

In S31, a sPDCCH transmitted by a network is detected in a control area, wherein the control area occupies M parts of resources among N parts of resources, the N parts of resources are acquired by dividing, in a frequency domain, frequency resources of symbols for transmitting the control area in a s-TTI, M and N are integers, and 1≤M≤N.

In some embodiments, the control area occupying the M parts of resources among the N parts of resources may include one of followings: the control area occupying M parts of resources distributed at intervals in the N parts of resources; and the control area occupying M parts of resources distributed continuously in the N parts of resources.

In some embodiments, to different cells, the M parts of resources may be different or not exactly the same.

In some embodiments, resources with numbers of mode (R_offset+iL, N) are selected from the N parts of resources as the M parts of resources, where i∈[0, M−1], R_offset is an offset of the resource, and L is an integer.

In some embodiments, a value of R_offset may be a value determined based on an ID of a cell or a value agreed with a terminal.

In some embodiments, a value of N may be determined based on agreement with the network and a terminal, or by the network. A value of M may be determined by the network based on a number of resources required by transmitting the sPDCCH in the s-TTI.

In some embodiments, in the frequency domain, the frequency resources of the symbols for transmitting the control area in the s-TTI may be divided in PRB, in PRB group, in sub-carrier, or in sub-carrier group.

The realization and advantages of the control area occupying the N parts of resources in the M parts of resources may refer to the above description of the communication control method which is applicable to the network and are not described in detail here.

In some embodiments, if a position of the symbols for transmitting the control area in the s-TTI is determined by the network, the method may further include S32.

In S32, the position of the symbols for transmitting the control area in the s-TTI is acquired from the network.

In some embodiments, the method may further include S33.

In S33, an indication message which indicates a ratio of M to N is received from the network.

When detecting the sPDCCH transmitted by the network in the control area, the terminal should know symbols where the control area is located, and a detailed resource location of the control area in the symbols, i.e., a position of the M parts of resources.

If the symbols where the control area is located, a division mode of the symbols (N parts of resources) where the control area is located, and a distribution rule of the M parts of resources are agreed between the network and the terminal, the terminal can obtain the position of the control area only if the ratio of M to N is known, and further the terminal may detect the sPDCCH transmitted by the network in the control area.

In some embodiments, receiving an indication message from the network may include detecting and processing a dedicated physical layer channel to acquire the indication message. In some embodiments, the dedicated physical layer channel may be configured to carry a K-bit message which carries the indication message, where $2^K ≥ N$.

The communication control method in the above embodiments may be applicable to a terminal, and may be used along with the communication control method for a network. Details and advantages of the method in the embodiment may be referred to the communication control method for the network, and are not described in detail here.

Figure 4:
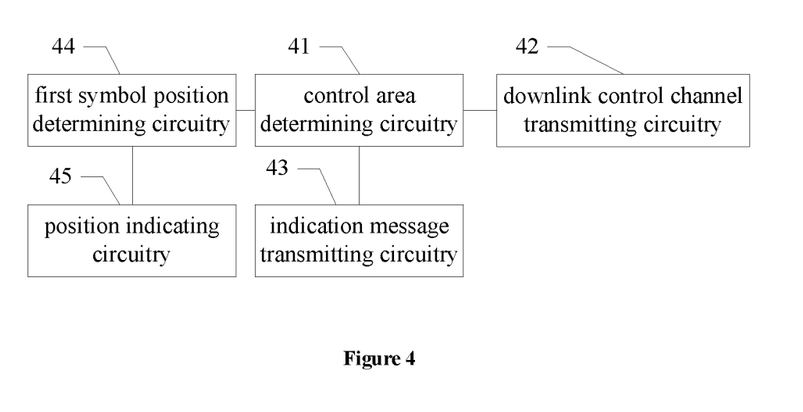
FIG. 4 schematically illustrates a structural diagram of a communication control device according to an embodiment.

Referring to FIG. 4, FIG. 4 schematically illustrates a structural diagram of a communication control device according to an embodiment. The communication control device may be applicable to a network. Details of the communication control device are described in conjunction with FIG. 4 below.

The communication control device includes: a control area determining circuitry 41 configured to determine M parts of resources for transmitting a control area in N parts of resources, wherein the N parts of resources are acquired by dividing, in a frequency domain, frequency resources of symbols for transmitting the control area in a s-TTI, M and N are integers, 1≤M≤N; and a downlink control channel transmitting circuitry 42 configured to transmit a sPDCCH to a terminal through the control area.

In some embodiments, a value of N may be determined based on agreement with the terminal or by the network.

In some embodiments, if the value of N is determined by the network, the device may be further configured to indicate the value of N to the terminal.

In some embodiments, in the frequency domain, the frequency resources of the symbols for transmitting the control area in the s-TTI may be divided in PRB, in PRB group, in sub-carrier, or in sub-carrier group.

In some embodiments, the control area determining circuitry 41 may be configured to determine a value of M based on a number of resources required by transmitting the sPDCCH in the s-TTI.

In some embodiments, the control area determining circuitry 41 may be configured to select the M parts of resources from the N parts of resources at intervals or without an interval.

In some embodiments, the control area determining circuitry 41 may be configured to determine M parts of different resources or M parts of resources not exactly the same for different cells.

Figure 5:
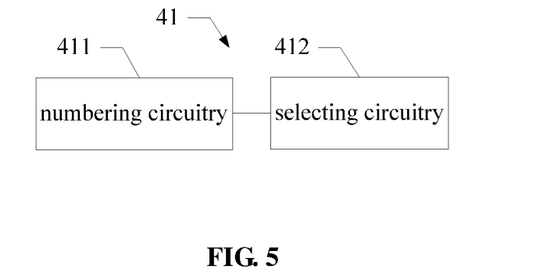
FIG. 5 schematically illustrates a structural diagram of a control area determining circuitry according to an embodiment.

In some embodiments, referring to FIG. 5, the control area determining circuitry 41 may include: a numbering circuitry 411 configured to number the N parts of resources; and a selecting circuitry 412 configured to select the M parts of resources with numbers of mode (R_offset+iL, N) from the N parts of resources, where i∈[0, M−1], R_offset is an offset of the resource, and L is an integer.

In some embodiments, a value of R_offset may be a value determined based on an ID of a cell or a value agreed with the terminal.

Still referring to FIG. 4, in some embodiments, the communication control device may further include an indication message transmitting circuitry 43 configured to transmit an indication message which indicates a ratio of M to N to the terminal, so that the terminal detects the sPDCCH based on the indication message.

In some embodiments, the communication control device may further include: a first symbol position determining circuitry 44 configured to determine a position of the symbols for transmitting the control area in the s-TTI; and a position indicating circuitry 45 configured to indicate the position of the symbols for transmitting the control area in the s-TTI to the terminal.

In some embodiments, the communication control device may further include a second symbol position determining circuitry (not shown in FIGS.) configured to determine a position of the symbols for transmitting the control area in the s-TTI based on the agreement with the terminal.

Details and advantages of the communication control device in the embodiment may be referred to the communication control method, and are not described in detail here.

Figure 6:
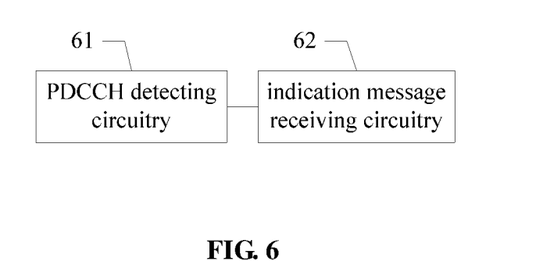
FIG. 6 schematically illustrates a structural diagram of a communication control device according to another embodiment.

FIG. 6 schematically illustrates a structural diagram of a communication control device according to another embodiment. The communication control device may be applicable to a terminal. Details of the communication control device are described in conjunction with FIG. 6 below.

The communication control device includes: a PDCCH detecting circuitry 61 configured to detect a sPDCCH sent by a network in a control area, wherein the control area occupies M parts of resources among N parts of resources, the N parts of resources are acquired by dividing, in a frequency domain, frequency resources of symbols for transmitting the control area in a s-TTI, M and N are integers, and 1≤M≤N.

The control area occupying the M parts of resources among the N parts of resources may include one of followings: the control area occupying M parts of resources distributed at intervals in the N parts of resources; and the control area occupying M parts of resources distributed continuously in the N parts of resources.

A value of N may be determined based on agreement with the network and the terminal, or by the network.

If the value of N is determined by the network, the communication control device may be further configured to acquire the value of N from the network.

A value of M may be determined by the network based on a number of resources required by transmitting the sPDCCH in the s-TTI.

In the frequency domain, the frequency resources of the symbols for transmitting the control area in the s-TTI may be divided into the N parts of resources in PRB, in PRB group, in sub-carrier, or in sub-carrier group.

In some embodiments, to different cells, the M parts of resources may be different or not exactly the same.

In some embodiments, resources with numbers of mode (R_offset+iL, N) are selected from the N parts of resources as the M parts of resources, where i∈[0, M−1], R_offset is an offset of the resource, and L is an integer.

In some embodiments, a value of R_offset may be a value determined based on an ID of a cell or a value agreed with the terminal.

In some embodiments, the communication control device may further include an indication message receiving circuitry 62 configured to detect and process a dedicated physical layer channel to acquire the indication message.

In some embodiments, the dedicated physical layer channel may be configured to carry a K-bit message which carries the indication message, where 2^K≥N.

In some embodiments, the communication control device may further include a third symbol position determining circuitry (not shown in FIGS.) configured to acquire a position of the symbols for transmitting the control area in the s-TTI from the network.

Details and advantages of the communication control device in the embodiment may be referred to the communication control method, and are not described in detail here.

Those skilled in the art can understand that all of or a portion of the processes in the method provided in the above embodiments can be implemented by related hardware with instruction of computer program. The computer program may be stored in a readable storage medium, and include the processes of the method provided in the above embodiments when it is executed. The readable storage medium may be a magnetic disk, an optical disk, a Read-Only Memory (ROM) or a Random Access Memory (RAM).

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A communication control method, comprising:
  determining M parts of resources for transmitting a control area in N parts of resources, wherein the N parts of resources are acquired by dividing, in a frequency domain, frequency resources of symbols for transmitting the control area in a shortened Transmission Time Interval (s-TTI), M and N are integers, 1≤M≤N; and
  transmitting a Physical Downlink Control Channel (PDCCH) to a terminal through the control area,
  wherein determining the M parts of resources for transmitting the control area in the N parts of resources comprises:
  numbering the N parts of resources; and
  selecting the M parts of resources with numbers of mode (R_offset+iL, N) from the N parts of resources, where mode represents performing modulo operation to N with R_offset+iL, i∈[0, M−1], R_offset is a resource offset, and L is an integer.

2. The method according to claim 1, further comprising:
  following determining the M parts of resources for transmitting the control area in the N parts of resources, transmitting an indication message which indicates a ratio of M to N to the terminal, so that the terminal detects the PDCCH based on the indication message.

3. The method according to claim 1, wherein determining the M parts of resources for transmitting the control area in the N parts of resources comprises one of followings: selecting the M parts of resources from the N parts of resources at intervals; and selecting the M parts of resources from the N parts of resources without an interval.

4. The method according to claim 1, wherein a value of N is determined based on agreement with the terminal or by a network.

5. The method according to claim 1, wherein in the frequency domain, the frequency resources of the symbols for transmitting the control area in the s-TTI are divided in Physical Resource Block (PRB), in PRB group, in sub-carrier, or in sub-carrier group.

6. The method according to claim 1, wherein a value of R_offset is a value determined based on an identifier (ID) of a cell or a value agreed with the terminal.

7. The method according to claim 1, further comprising:
  determining a position of the symbols for transmitting the control area in the s-TTI; and
  indicating the position of the symbols for transmitting the control area in the s-TTI to the terminal.

8. A communication control method, comprising:
  detecting a Physical Downlink Control Channel (PDCCH) sent by a network in a control area, wherein the control area occupies M parts of resources among N parts of resources, the N parts of resources are acquired by dividing, in a frequency domain, frequency resources of symbols for transmitting the control area in a shortened Transmission Time Interval (s-TTI), M and N are integers, and 1≤M≤N,
  wherein resources with numbers of mode (R_offset+iL, N) are selected from the N parts of resources as the M parts of resources, where mode represents performing modulo operation to N with R_offset+iL, i∈[0, M−1], R_offset is a a resource offset, and L is an integer.

9. The method according to claim 8, further comprising:
  receiving an indication message which indicates a ratio of M to N from the network, wherein detecting the PDCCH in the control area comprises detecting the PDCCH in the control area based on the indication message.

10. The method according to claim 8, wherein the control area occupying the M parts of resources among the N parts of resources comprises one of followings: the control area occupying the M parts of resources distributed at intervals in the N parts of resources; and the control area occupying the M parts of resources distributed continuously in the N parts of resources.

11. The method according to claim 8, wherein in the frequency domain, the frequency resources of the symbols for transmitting the control area in the s-TTI are divided in Physical Resource Block (PRB), in PRB group, in sub-carrier, or in sub-carrier group.

12. The method according to claim 8, wherein a value of R_offset is a value determined based on an identifier (ID) of a cell or a value agreed with a terminal.

13. The method according to claim 8, further comprising: prior to detecting the PDCCH sent by the network in the control area, acquiring a position of the symbols for transmitting the control area in the s-TTI from the network.

14. A communication control device, comprising:
a control area determining circuitry configured to determine M parts of resources for transmitting a control area in N parts of resources, wherein the N parts of resources are acquired by dividing, in a frequency domain, frequency resources of symbols for transmitting the control area in a shortened Transmission Time Interval (s-TTI), M and N are integers, $1 \leq M \leq N$; and
a downlink control channel transmitting circuitry configured to transmit a Physical Downlink Control Channel (PDCCH) to a terminal through the control area,
wherein the communication control device further comprises:
a numbering circuitry configured to number the N parts of resources; and
a selecting circuitry configured to select the M parts of resources with numbers of mode (R_offset+iL, N) from the N parts of resources, where mode represents performing modulo operation to N with R_offset+iL, i∈[0, M−1], R_offset is a resource offset, and L is an integer.

15. The device according to claim 14, further comprising an indication message transmitting circuitry configured to transmit an indication message which indicates a ratio of M to N to the terminal, so that the terminal detects the PDCCH based on the indication message.

16. The device according to claim 14, wherein the control area determining circuitry is configured to select the M parts of resources from the N parts of resources at intervals or without an interval.

17. The device according to claim 14, wherein a value of N is determined based on agreement with the terminal or by a network.

18. The device according to claim 14, wherein in the frequency domain, the frequency resources of the symbols for transmitting the control area in the s-TTI are divided in Physical Resource Block (PRB), in PRB group, in sub-carrier, or in sub-carrier group.

19. A communication control device, comprising:
a Physical Downlink Control Channel (PDCCH) detecting circuitry configured to detect a PDCCH sent by a network in a control area, wherein the control area occupies M parts of resources among N parts of resources, the N parts of resources are acquired by dividing, in a frequency domain, frequency resources of symbols for transmitting the control area in a shortened Transmission Time Interval (s-TTI), M and N are integers, and $1 \leq N \leq N$,
wherein resources with numbers of mode (R_offset+iL, N) are selected from the N parts of resources as the M parts of resources, where mode represents performing modulo operation to N with R_offset+iL, i∈[0, M−1], R_offset is a resource offset, and L is an integer.

20. The device according to claim 19, further comprising:
an indication message receiving circuitry configured to receive an indication message which indicates a ratio of M to N from the network, wherein the PDCCH detecting circuitry is configured to detect the PDCCH in the control area based on the indication message.

21. The device according to claim 19, wherein the control area occupying the M parts of resources among the N parts of resources comprises one of followings: the control area occupying the M parts of resources distributed at intervals in the N parts of resources; and the control area occupying the M parts of resources distributed continuously in the N parts of resources.

22. The device according to claim 19, wherein in the frequency domain, the frequency resources of the symbols for transmitting the control area in the s-TTI are divided in Physical Resource Block (PRB), in PRB group, in sub-carrier, or in sub-carrier group.

* * * * *